United States Patent
Konabe

(10) Patent No.: US 7,659,335 B2
(45) Date of Patent: Feb. 9, 2010

(54) FLUOROPOLYMER DISPERSION AND ELECTRODE COMPOSITION CONTAINING SAME

(75) Inventor: Kazuo Konabe, Shizuoka (JP)

(73) Assignee: Dupont-Mitsui Fluorochemicals Co Ltd, Tokyo (JP)

( * ) Notice: Subject to any disclaimer, the term of this patent is extended or adjusted under 35 U.S.C. 154(b) by 623 days.

(21) Appl. No.: 11/247,044

(22) Filed: Oct. 11, 2005

(65) Prior Publication Data

US 2006/0078800 A1    Apr. 13, 2006

Related U.S. Application Data

(60) Provisional application No. 60/618,247, filed on Oct. 13, 2004.

(51) Int. Cl.
*C08K 5/06* (2006.01)

(52) U.S. Cl. ...................... 524/366; 524/378

(58) Field of Classification Search ................. 524/366, 524/378
See application file for complete search history.

(56) References Cited

U.S. PATENT DOCUMENTS

| 3,037,953 A | 6/1962 | Marks et al. |
| 6,153,688 A | 11/2000 | Miura et al. |
| 7,282,528 B2 * | 10/2007 | Asano et al. ................. 524/291 |

FOREIGN PATENT DOCUMENTS

| JP | 1164437 | 6/1989 |
| JP | 2071841 | 3/1990 |
| JP | 1995227540 A | 8/1995 |
| JP | 1996268919 A | 10/1996 |
| JP | 1999152385 A | 6/1999 |
| JP | 2000061303 A | 2/2000 |
| JP | 2002179870 A | 6/2002 |

* cited by examiner

*Primary Examiner*—Edward J Cain

(57) ABSTRACT

A composition comprising an aqueous dispersion of fluoropolymer particles stabilized with a polyoxyethylene alkyl ether surfactant having a polydispersity index, Mw/Mn, of 1.15 or less, useful in compositions comprising electrode material.

7 Claims, 4 Drawing Sheets

FLUOROPOLYMER DISPERSION AND ELECTRODE COMPOSITION CONTAINING SAME

FIELD OF THE INVENTION

The present invention relates to a dispersion of fluoropolymer particles useful for the manufacture of electrodes and more particularly relates to a composition containing an electrode material and a dispersion of fluoropolymer particles.

BACKGROUND OF THE INVENTION

During the concentration operation often used in the preparation of aqueous fluoropolymer dispersions, e.g., aqueous polytetrafluoroethylene (PTFE) dispersion, nonionic surfactants are added in order to improve dispersion stability. U.S. Pat. No. 3,037,953 discloses the preparation of concentrated PTFE aqueous dispersions using nonionic surfactants such as polyoxyethylene octyl phenyl ether and ethylene nonyl phenyl ether for use in preparing concentrated PTFE aqueous dispersions. These PTFE aqueous dispersions containing blended polyoxyethylene alkyl phenyl ethers provide dispersion stability, but disadvantages have been reported. For example, such surfactants can decompose to form harmful compounds that may have adverse health or environmental impact.

For this reason, PTFE aqueous dispersions are now being developed that contain, instead of polyoxyethylene alkyl phenyl ethers, blended polyoxyethylene alkyl ethers that do not contain benzene rings and thus do not generate harmful aromatic compounds. For example, Japanese Kokai Patent Application No. Hei 8[1996]-269285 (U.S. Pat. No. 6,153,688) discloses PTFE aqueous dispersions with cloud points of 45-85° C. for use with fibrous substrates and containing polyoxyethylene alkyl ethers that do not release harmful substances such as benzene upon degradation. This publication also mentions that these PTFE aqueous dispersions may be used as a binder in batteries. In addition, PTFE aqueous dispersions containing branched polyoxyethylene alkyl ethers with saturated alkyl groups have been disclosed in Japanese Kokai Patent Application No. Hei 11[1999]-152385 for use in the production of high-strength PTFE films with improved thickness uniformity. Japanese Kokai Patent Application No. 2002-179870 discloses that the use of polyoxyalkylene-based nonionic surfactants having alkyl groups with 16 or greater carbon atoms provide superior environmental properties and dispersion stability.

For electrode applications, e.g., battery or fuel cell electrodes, nonionic surfactants in a PTFE aqueous dispersion employed as a binder or hydrophobic agent as should possess certain properties to achieve good results. During electrode manufacture, the dispersions are combined with electrode materials and these mixtures are dried by heating. Surfactant is removed during drying step. However, since the PTFE and/or electrode materials in the electrode may be adversely affected by high temperatures, the surfactant should be sufficiently volatile that surfactant is removed without resort to excessive heating. Also, the surfactant should not be prone to degradation upon heating which can leads to deposits on the electrode. Deposits on the electrode have the potential to directly interfere with electrode function or to react with cell chemicals to form products which adversely affect the operation in the cell. It is also important for the dispersions to contain at most low levels of metal impurities that may lead to undesirable effects in electrode applications. Resistance to sedimentation and good viscosity stability are also desirable.

Polyoxyalkylene alkyl ethers, specifically polyoxyethylene alkyl ethers commonly used as nonionic surfactants, have a wide alkylene oxide (e.g., ethylene oxide) molar addition distribution relative to polyoxyalkylene alkyl phenyl ethers such as polyoxyethylene octyl phenyl ether or polyoxyethylene nonyl phenyl ether. Because their molecular weight distributions of such polyoxyalkylene alkyl ethers are extremely broad, they typically contain high molecular weight fractions of low volatility. Such fractions require high drying temperatures and are prone to thermal degradation. On the other hand, a low molecular weight fraction can also be present which, in significant amount, compromises sedimentation stability and viscosity stability. The polyoxyalkylene alkyl ethers typically used also have a high content of alkali metal and other impurities because they are generally produced using catalysts containing alkali metals such as sodium hydroxide.

SUMMARY OF THE INVENTION

In accordance with the invention, a composition is provided comprising an aqueous dispersion of fluoropolymer particles stabilized with a polyoxyethylene alkyl ether surfactant having a polydispersity index, Mw/Mn, of 1.15 or less.

In accordance with another form of the invention, a composition is provided comprising an electrode material and an aqueous dispersion of fluoropolymer particles stabilized with a polyoxyethylene alkyl ether surfactant having a polydispersity index, Mw/Mn, of 1.15 or less.

Preferably, the polyoxyethylene alkyl ether surfactant of the dispersion has an alkali metal content of 2 ppm or less.

The present invention provides an environmentally friendly electrode composition comprising aqueous dispersion of fluoropolymer particles that is stabilized by a polyoxyethylene alkyl ether surfactant with a polydispersity index of 1.15 or less, facilitating volatilization of the surfactant during electrode manufacture. Preferably, superior sedimentation stability and viscosity stability are also provided.

DETAILED DESCRIPTION OF THE INVENTION

Figure 1:
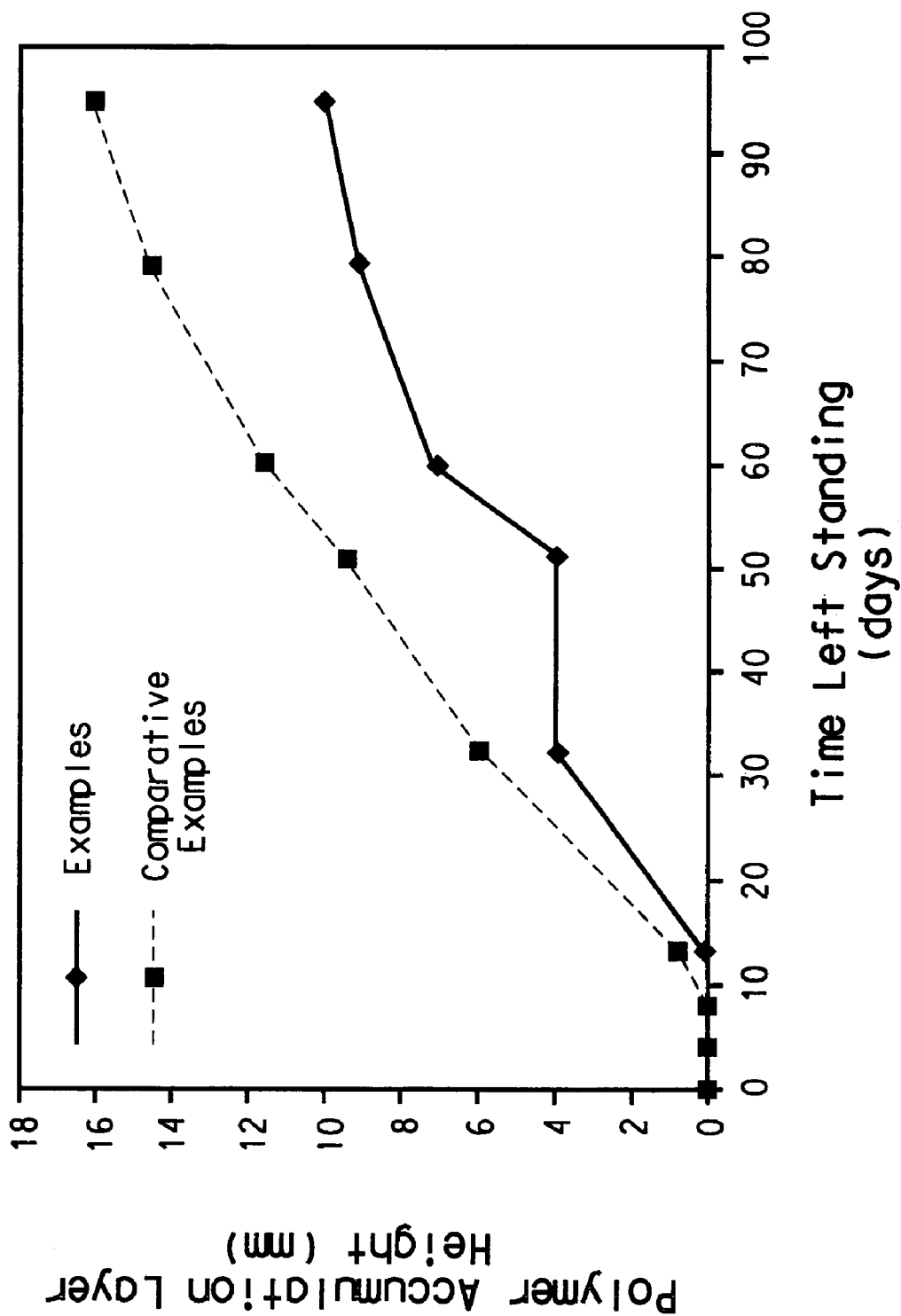
FIG. 1 shows the relationship between number of days left standing and polymer accumulation with the PTFE aqueous dispersions used in the Example and in the Comparative Example.

Applicant has discovered that it is advantageous, in an aqueous dispersion of fluoropolymer particles, to use a polyoxyethylene alkyl ether surfactant having a polydispersity index, Mw/Mn, of 1.15 or less, particularly for use in an electrode composition. Such surfactant does not require excessive heating for volatilization in electrode manufacture. Volatilization in the present application means conversion of the surfactant into a gas, primarily by evaporation, but including decomposition which results in surfactant removal. The composition in accordance with the invention does not decompose to produce significant quantities of deposits during electrode manufacture. Preferably, the composition provides low sedimentation and good viscosity stability while providing extremely low environmental impact. Preferred compositions also have low metal impurity content.

The polyoxyethylene alkyl ether surfactant used in the compositions in accordance present invention is preferably a nonionic surfactant represented by the formula

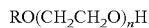

(in the formula, R denotes an unsaturated or saturated hydrocarbon group and n denotes the average value of the ethylene oxide number (molar addition number)), where the polydispersity index (Mw/Mn), which is a value determined by dividing the weight-average molecular weight Mw by the number-average molecular weight Mn of the aforementioned surfactant, is 1.15 or less. It is less desirable to use a polyoxypropylene alkyl ether instead of the aforementioned polyoxyethylene alkyl ether, since a surfactant with less favorable volatility properties is produced. It is preferable for R in the above formula to have a carbon number of 8-18, with a range of 10-16 being preferred from the standpoint of sedimentation stability of the fluoropolymer particles. In addition, n, which represents the average ethylene oxide molar addition number, is preferably 5-20, with a range of 7-15 being more preferred from the standpoint of thermal degradation properties, sedimentation stability and viscosity stability.

The polydispersity index (Mw/Mn) of the aforementioned surfactant is a value that expresses the molecular weight distribution of the surfactant and thus indicates the ethylene oxide molar addition distribution. As Mw/Mn approaches 1, the molecular weight distribution becomes narrow, i.e., the number of ethylene oxide molecules added is uniform in the surfactant. An examples of this type of surfactant is Leocol TDN-90-80 ($C_{13}H_{27}O(C_2H_4O)_9H$) manufactured by Lion Corp., which has a Mw/Mn ratio of 1.12.

Polyoxyethylene alkyl ether surfactants that have Mw/Mn ratios in excess of 1.15 will not contribute to favorable dispersion properties and typically have low volatility, high molecular weight components which are prone to thermal degradation. The cloud point is low and viscosity increases at low temperatures and a large quantity of low molecular weight component which may readily sediment out will be contained in the aqueous fluoropolymer dispersion. As a result, a lengthy thermal treatment at high temperature will be necessary in order to remove the surfactant, or there will be problems with poor stability of the aqueous fluoropolymer dispersion itself. The use of such surfactants is thus undesirable.

In addition, it is preferable for the total amount of alkali metal such as potassium or sodium contained in the polyoxyethylene alkyl ether surfactant of the present invention to be 2 ppm or less. Polyoxyethylene alkyl ether surfactants that are synthesized using solid catalysts have narrow ethylene oxide molar addition distributions, and also have extremely low metal impurity contents, and are thus particularly desirable. If the total amount of alkali metal exceeds 2 ppm, then there may be detrimental influences on cell characteristics if the aqueous fluoropolymer dispersion is used in an electrode.

Polyoxyethylene alkyl ether surfactants having these properties are preferably obtained by a reaction between an aliphatic alcohol and ethylene oxide using a magnesium oxide-containing solid catalyst described, for example, in Japanese Kokai Patent Application No. Hei 1[1989]-164437, Japanese Kokai Patent Application No. Hei 2[1990]-71841, Japanese Kokai Patent Application No. Hei 7[1995]-227540, Japanese Kokai Patent Application No. Hei 8[1996]-268919 or Japanese Kokai Patent Application No. 2000-61304, and preferably, a complex oxide catalyst containing magnesium, aluminum and at least one metal selected from Groups 6A, 7A and 8. The polyoxyethylene alkyl ether surfactants synthesized using these magnesium oxide-containing solid catalysts have extremely low impurity content of metals and the like, and also have a narrow distribution of ethylene oxide molar addition numbers. Most preferably, the polyoxyethylene alkyl ether surfactant is produced using a solid catalyst containing magnesium oxide.

The blend amount of polyoxyethylene alkyl ether surfactant in the present invention is preferably 2-15 parts by weight, more preferably 3-12 parts by weight, with respect to 100 parts by weight of the fluoropolymer. If the blend amount of the aforementioned surfactant is less than 2 parts by weight, then the amount may be inadequate to stabilize the aqueous fluoropolymer dispersion, whereas if the amount exceeds 15 parts by weight, then the aqueous fluoropolymer dispersion may become viscous, or the viscosity may be highly temperature-dependent, which is undesirable.

One or a mixture of two or more types of polyoxyethylene alkyl ether surfactant may be used in the present invention.

Examples of fluoropolymers that may be used in the aqueous dispersion of the present invention are polymers and copolymers of tetrafluoroethylene, fluorotrifluoroethylene, vinylidene fluoride. These polymers include, for example, PTFE, tetrafluoroethylene-hexafluoropropylene copolymers, tetrafluoroethylene-fluoroalkylvinyl ether copolymers, tetrafluoroethylene-ethylene copolymers, polychlorotrifluoroethylene, polyvinylidene fluoride and vinylidene fluoride-hexafluoropropylene copolymers. Among these compounds, particularly desirable polymers are PTFE or copolymers of tetrafluoroethylene copolymerized with low amounts of other monomer at levels whereby melt processing is substantially impossible.

It is preferable for the aqueous fluoropolymer dispersion and electrode compositions of the present invention to contain fluoropolymer microparticles with average particle diameters of about 0.1-0.4 μm, preferably in the amount of 25-70 wt %, specifically 30-65 wt %, with respect to the water. This type of aqueous dispersion can be prepared from raw dispersion obtained by emulsion polymerization, for example, by adding the aforementioned polyoxyethylene alkyl ether surfactant to the raw dispersion, followed by thermal treatment, removal of the supernatant as a second separated layer, and then the addition of more of the aforementioned surfactant as necessary.

Because the polydispersity index (Mw/Mn) of the polyoxyethylene alkyl ether surfactant used in the present invention is 1.15 or less, little high molecular weight component that can cause undesirable thermal degradation is present, and there is also little low molecular weight component that does not contribute to dispersion properties and potentially facilitates sedimentation of the aqueous fluoropolymer dispersion due to the low clouding point and increase in low-temperature viscosity.

Consequently, the aqueous fluoropolymer dispersion stabilized with this type of polyoxyethylene alkyl ether surfactant used in a composition in accordance with the present invention facilitates surfactant removal without decomposition and preferably has excellent sedimentation stability and viscosity stability. The composition is thus particularly useful in the manufacture of electrodes for use in cells of batteries and fuel cells.

Electrode materials are added to the aqueous fluoropolymer dispersion to produce the electrode compositions in accordance with the invention. Any of a wide variety of known electrode materials can be used as is known in the art to impart the desired properties to an electrode formed using the compositions. Preferred electrode materials for use in battery electrodes include manganese dioxide, nickel hydroxide, hydrogen occlusion alloys, lithium cobaltate, lithium nickelate, lithium manganate, carbon, graphite and mixtures thereof.

Electrodes may be made from the compositions in accordance with the invention using known techniques for the manufacture of electrodes. Metal nets or foils may be incorporated into the electrodes if desired. Pigments, solvents, thickeners, leveling agents and various other types of additives can be blended as needed for various applications. For use in fuel cells, polymer electrolyte materials such as perfluorosulfonic acid resin in dispersion or solution form may be included in the composition if desired.

EXAMPLES

The present invention is described in additional detail below using examples embodying the invention. The raw materials and methods for measuring the various physical properties in the Example and Comparative example are presented below.

1. Raw Materials (1) Raw aqueous fluoropolymer dispersion: 45 wt % PTFE aqueous dispersion produced by emulsion polymerization (Mitsui DuPont Fluorochemical, Japan; average particle diameter 0.27 μm)

(2) Ethylene oxide alkyl ether (nonionic surfactant)

The ethylene oxide numbers (number of added moles) in the formula below denote average values.

(1) Polyoxyethylene Alkyl Ether with a Mw/Mn Ratio of 1.15 or Less

Product name: Leocol TDN-90-80 ($C_{13}H_{27}O(C_2H_4O)_gH$), Mw/Mn ratio 1.12; manufactured by Lion Corp.)

(2) Polyoxyethylene Alkyl Ether with a Mw/Mn Ratio Greater than 1.15

Product name: Leocol SC-90 ($C_{12}H_{25}O(C_2H_4O)_9H$) and $C_{14}H_{29}O(C_2H_4O)_gH$, Mw/Mn ratio 1.22; manufactured by Lion Corp.)

2. Measurement of Physical Properties (1) Polydispersity Index of the Surfactant (Mw/Mn)

The polydispersity index is measured using the 8020 system (detector: R18021; manufactured by Tosoh). The measurement conditions are presented below.

Column: TSK G1000 HXL+TSK G2500 HXL
Mobile phase: T HF 0.5 mL/min
Temperature: 40° C.
Concentration: 1 wt %

(2) Metal Content

A sample (surfactant) is collected in a PTFE vessel, ultra-high purity nitric acid is added and, after sealing the container, MW (microwave) decomposition is carried out. After completion of decomposition, the solution is allowed to cool and is diluted 100× with ultrapure water before quantification of the metal component by means of ICP-MS (high-frequency plasma mass spectrometry). It is added to the decomposition solution in advance as an internal standard element. ICP-MS device: HP4500, manufactured by Yokogawa Analytical Systems MW analysis device: MDS2000, manufactured by CEM (3) Thermal Degradation A thermogravimetric analyzer (TGA2050; TA Instruments) is used, and the change in mass over a period of 5 hours is measured while maintaining the material at 320° C. after increasing the temperature of the surfactant (approximately 10 mg) from room temperature to 320° C. at a rate of 20° C./min in a nitrogen atmosphere.

A decrease in mass occurs with volatilization of the surfactant, but the change in mass stops upon completion of volatilization. Favorable thermal degradation properties are indicated when there is a short period of time until mass change stops (time at which volatilization stops).

(4) Sedimentation Stability

The aqueous fluoropolymer dispersion is introduced into a test tube (liquid layer height 140 mm), and is allowed to stand at room temperature. After standing for the time period indicated in FIG. 1, the test tube is inverted and returned ten times, and then the aqueous fluoropolymer dispersion is discarded. The height of the fluoropolymer layer sedimented at the bottom of the test tube is then measured in order to investigate height with respect to standing time.

Higher accumulated resin layer heights denote decreasing sedimentation stability, and shorter accumulation periods indicate short storage times.

(5) Viscosity Stability

The viscosity of the aqueous fluoropolymer dispersion is measured with a B-type viscometer (No. 1 rotor, 60 rpm). The temperature of the decomposition solution is varied stepwise, and the viscosity is measured at the respective temperatures.

As the temperature increases, the aqueous dispersion stabilized with nonionic surfactant generally exhibits a dramatic increase in viscosity at a certain temperature. This is a phenomenon that occurs due to a change from hydrophilicity to hydrophobicity in the surfactant, and when the viscosity has increased in this manner, an unstable condition is produced in which the polymer readily separates from the water. Consequently, it is desirable from the standpoint of stability of the aqueous dispersion to delay the increase in viscosity until the highest temperature possible.

(6) Average Particle Size

The average particle diameter of the fluoropolymer microparticles can be measured by frequency analysis of light scattered as a result of the impingement of laser light. In the application examples and comparative examples presented below, the values are measured using a model 9340 Microtrac UPA150 device (Nikkiso Co., Ltd.).

3. Measured Properties of Polyethylene Oxide Alkyl Ether Nonionic Surfactants

The polydispersity index (Mw/Mn), metal content and thermal degradation properties of the surfactant Leocol TDN-90-80 are measured. The polydispersity index is 1.12 and the alkali metal content is 0.98 ppm. The contents of other metals are presented in Table 1. The volatilization behavior is presented in FIG. 2.

The polydispersity index (Mw/Mn), metal content and thermal degradation properties of the surfactant Leocol SC-90 are measured. The polydispersity index is 1.22 and the alkali metal content is 170.98 ppm. The contents of other metals are presented in Table 1. The volatilization behavior is presented in FIG. 2.

TABLE 1

| Metal content (ppm) | Surfactant type | | Detection Limit |
| --- | --- | --- | --- |
| | Leocol TDN-90-80 (Example) | Leocol SC-90 (Comparative Example) | |
| Fe | ND | 9.19 | 0.02 |
| Ca | 0.15 | 0.45 | 0.02 |
| K | 0.28 | 0.98 | 0.02 |
| B | ND | 1.73 | 0.05 |
| Na | 0.70 | 170.00 | 0.05 |
| Al | ND | 0.25 | 0.05 |
| Cr | ND | 0.13 | 0.05 |
| Cu | ND | 0.73 | 0.05 |
| Zn | ND | 0.58 | 0.05 |

In the Table, ND denotes that the value is below the limit of detection. Other undetected elements (detection limit: 0.05 ppm). Li, Be, Mg, Sc, Ti, V, Mn, Co, Ni, Ga, Ge, As, Se, Rb, Sr, Y, Zr, Nb, Mo, Ru, Rh, Pd, Ag, Cd, Sn, Sb, Te, Cs, Ba, La, Ce, Pr, Nd, Sm, Eu, Gd, Tb, Dy, Ho, Er, Tm, Yb, Lu, Hf, Ta, W, Re, Os, Ir, Pt, Au, Hg, Tl, Pb, Bi, Th, U Example Tetrafluoroethylene (TFE) is Subjected to Emulsion polymerization in an aqueous medium in the presence of a polymerization initiator (succinic peroxide), dispersant (ammonium perfluorocarboxylate) and polymerization stabilizer (higher paraffin) to obtain an aqueous dispersion containing 45 wt % PTFE particles. The average particle diameter is 0.27 μm. The aforementioned polyoxyethylene alkyl ether Leocol TDN-90-80 is then added in the amount of 10 wt % (based on weight of polymer solids) to the PTFE particles, the pH is adjusted to 9-10 with aqueous ammonia, and the suspension is heated while stirring and left at 70° C. After standing briefly, a supernatant appeared, and a determinate quantity of the supernatant is collected to obtain an aqueous dispersion with a solids concentration of 58 wt %. The aforementioned Leocol TDN-90-80 is then added in the amount of 9 wt % with respect to the PTFE particles. The results of measuring the sedimentation stability of this aqueous dispersion are presented in FIG. 1, and the results of measuring the viscosity stability are presented in FIG. 3. Aqueous dispersions are also obtained by changing the added amount of Leocol TDN-90-80 in order to adjust the ratio thereof to 6, 10, 11 and 12 wt %. The viscosity stability of these dispersions is measured, and the results are compiled and presented in FIG. 3.

Comparative Example

The same process is carried out using Leocol SC-90 instead of TDN-90-80 as the polyoxyethylene alkyl ether, and aqueous dispersions are obtained that contained a 58 wt % solids concentration and Leocol SC-90 in the amount of 9 wt % with respect to the PTFE particles. The sedimentation stability of this dispersion is measured, and the results are presented in FIG. 1. The results of measuring viscosity stability are presented in FIG. 4. In addition, the added amount of Leocol SC-90 is changed in order to obtain aqueous dispersions with concentrations of 10 and 11 wt %, and the results of measuring the viscosity stabilities of these aqueous dispersions are presented together in FIG. 4.

Figure 2:
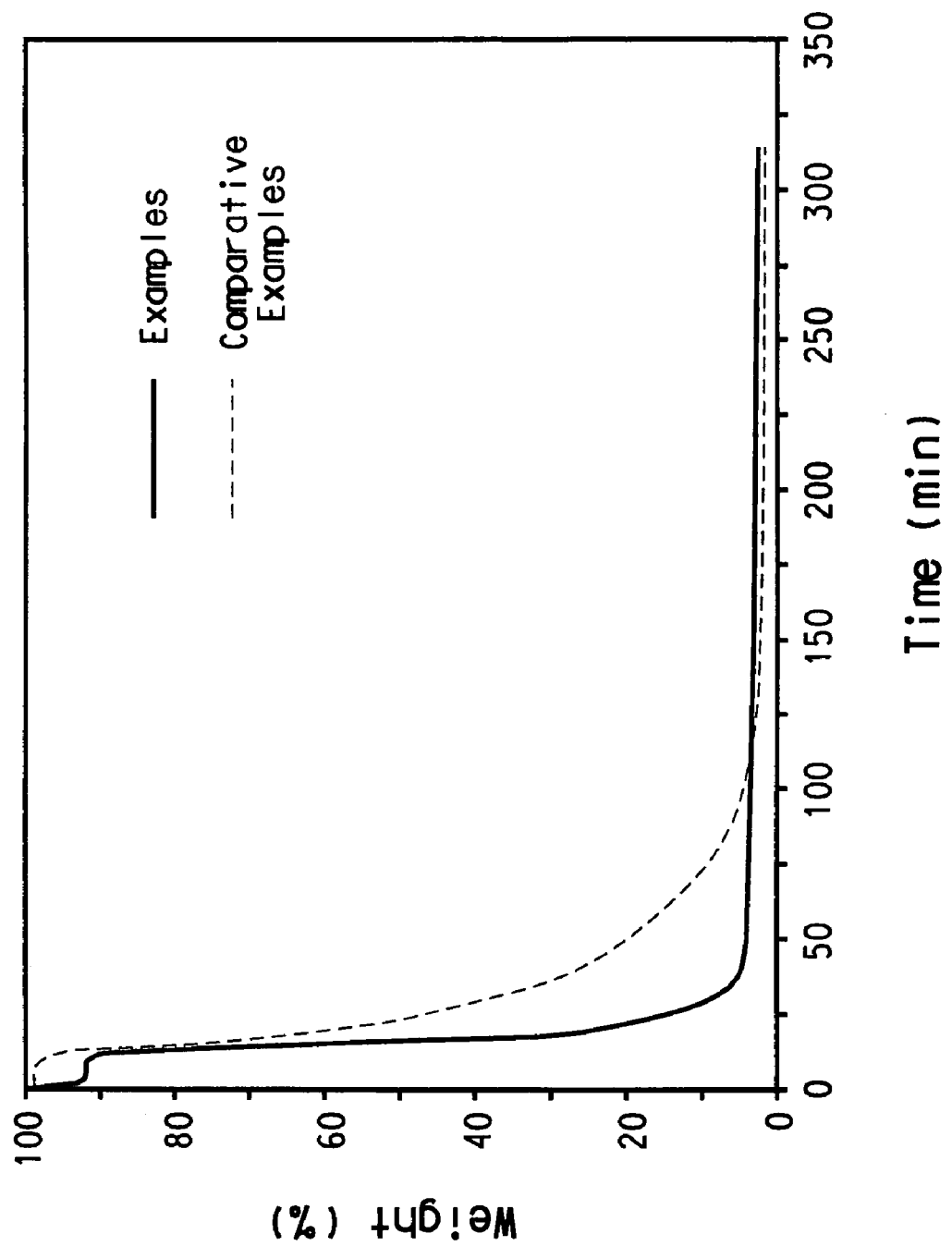
FIG. 2 is a thermogram showing volitilization properties of the surfactant used in the Example and the surfactant used in the Comparative Example.
Figure 3:
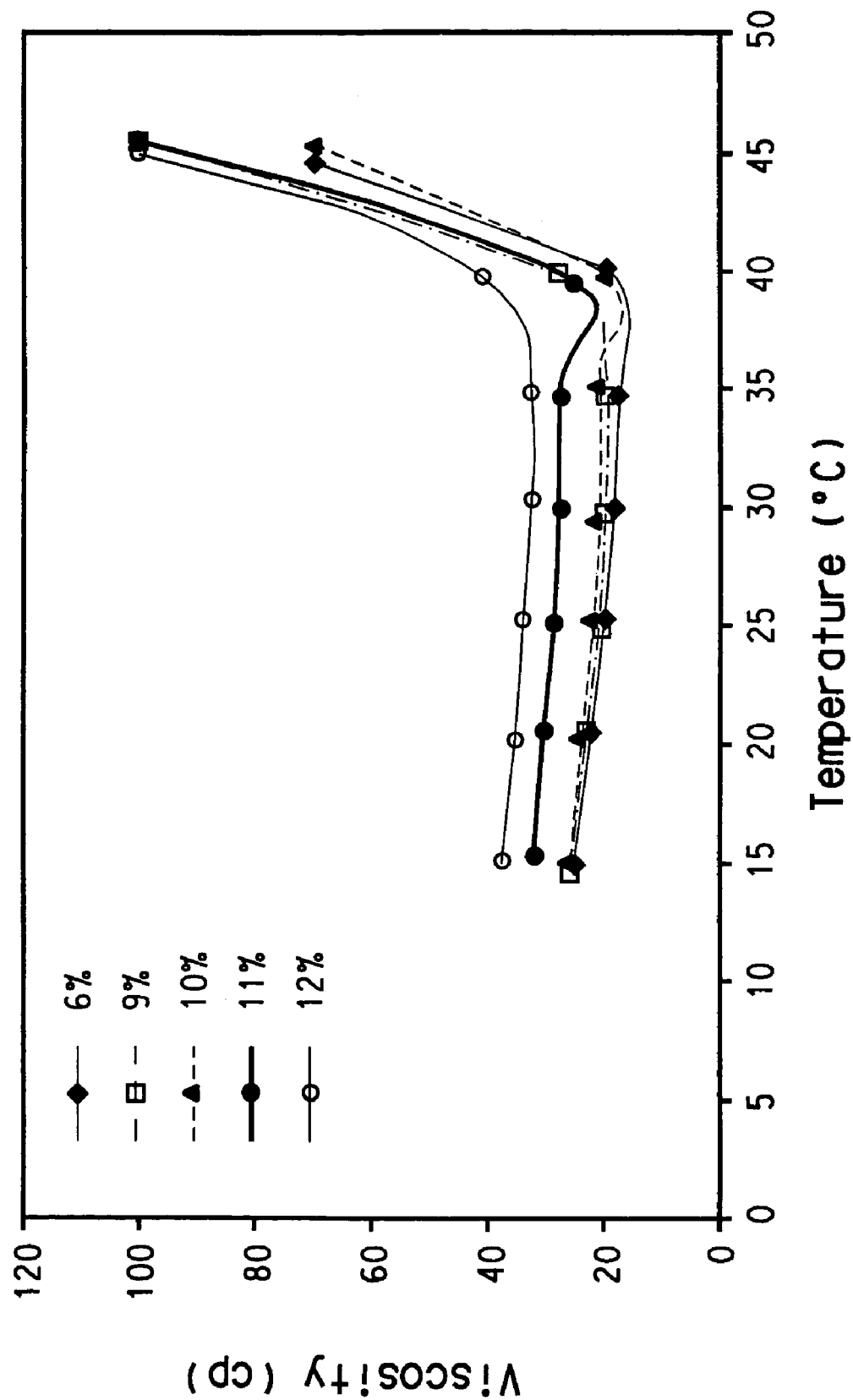
FIG. 3 shows viscosity-temperature curves for PTFE aqueous dispersion having different surfactant addition amounts pertaining to the present invention as described in the Example.
Figure 4:
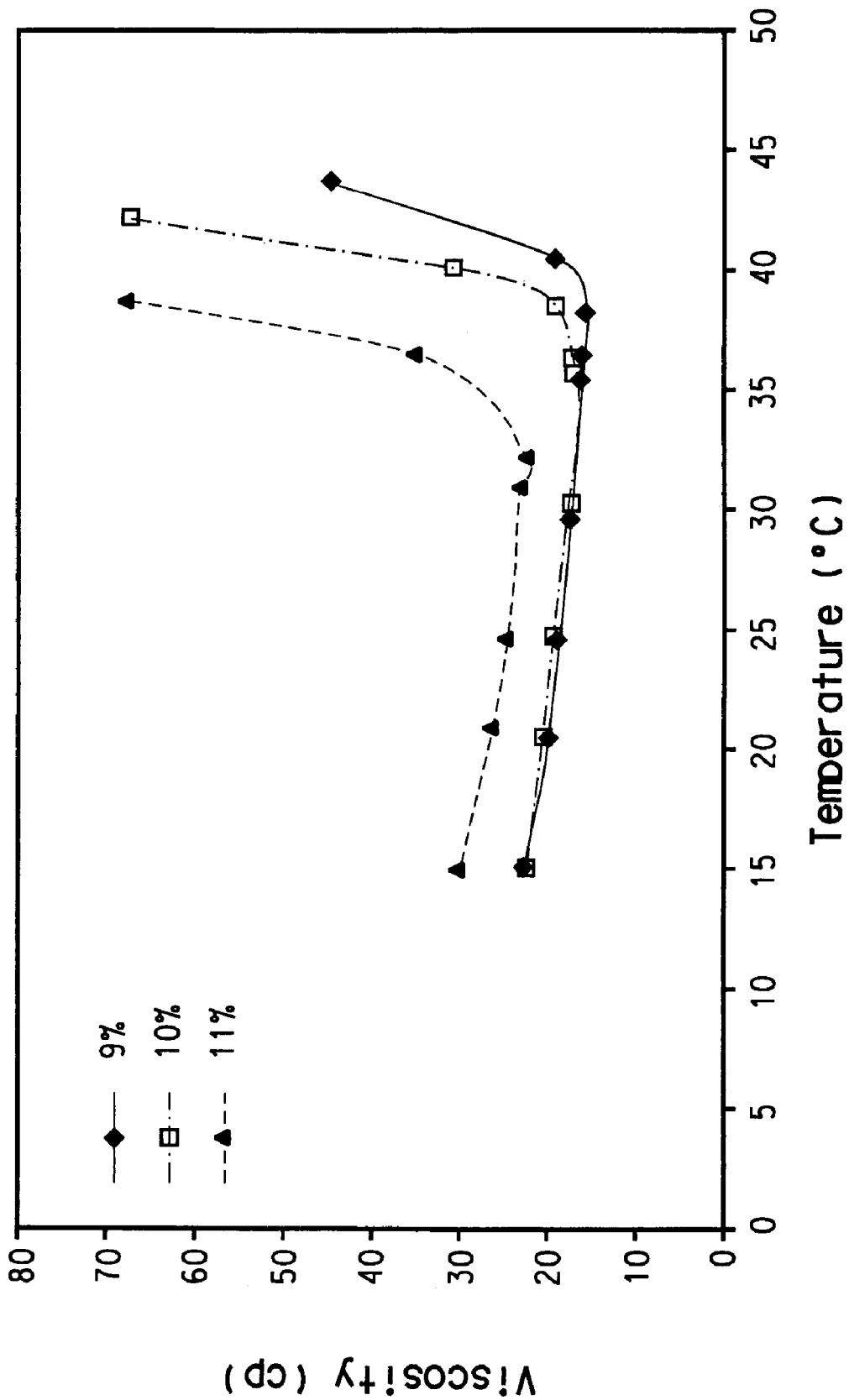
FIG. 4 shows viscosity-temperature curves for PTFE aqueous dispersions having different surfactant addition amounts as described in the Comparative Example.

From the thermograms presented in FIG. 2, it is clear that the surfactant of the Example of the invention underwent volatilization in a shorter period of time than the surfactant of that is used in the Comparative Examples. In addition, from the graph of FIG. 1 showing the relationship between standing time of the PTFE aqueous dispersion and the polymer accumulation layer height, it is clear that the dispersion of the application examples resisted sedimentation to a greater extent than the dispersions of the comparative examples, thus having superior sedimentation stability. In addition, from FIG. 3 and FIG. 4 showing the viscosity-temperature curves of the PTFE aqueous dispersions, it is clear that although there is almost no change in the temperature at which the viscosity increased as a result of addition of up to 12 wt % of surfactant with respect to PTFE in the application examples, the temperature at which the viscosity increased shifted to the low temperature side in the comparative examples, even with dispersions in which the surfactant is present at 11 wt % with respect to the PTFE. In order to improve the thick coating properties of dispersions, a technique is used in which the added amount of surfactant is increased, and thus with the aqueous dispersion of the Example of the invention, an improvement in thick coating properties can be achieved while maintaining viscosity stability. In addition, from Table 1 which shows the metal impurity contents in the surfactants, it is clear that the metal impurity contents in the surfactants used in the application examples, and specifically the alkali metal contents, are extremely low relative to those of the surfactants used in the Comparative Example. Thus, compositions in accordance with the invention are desirable for use in electrodes.

What is claimed is:

1. A composition comprising an electrode material and an aqueous dispersion of fluoropolymer particles stabilized with a polyoxyethylene alkyl ether surfactant having a polydispersity index, Mw/Mn, of 1.15 or less, wherein said electrode material comprises manganese dioxide, nickel hydroxide, hydrogen occlusion alloys, lithium cobaltate, lithium nickelate, lithium manganate, carbon, graphite and mixtures thereof.

2. The composition of claim 1, wherein said polyoxyethylene alkyl ether surfactant of said dispersion has an alkali metal content of 2 ppm or less.

3. The composition of claim 1, wherein said polyoxyethylene alkyl ether surfactant of said dispersion has an average ethylene oxide molar addition number of about 5 to about 20.

4. The composition of claim 1, wherein the alkyl group of said polyoxyethylene alkyl ether surfactant of said dispersion is a saturated or unsaturated alkyl group having 8 to 18 carbon atoms.

5. The composition of claim 1, wherein said polyoxyethylene alkyl ether surfactant of said dispersion is produced using a solid catalyst containing magnesium oxide.

6. The composition of claim 1, wherein said aqueous dispersion comprises about 25 to about 70 wt % fluoropolymer particles.

7. The composition of claim 1, wherein said aqueous dispersion of fluoropolymer particles of said dispersion comprises about 2 to about 15 parts by weight of said polyoxyethylene alkyl ether surfactant with respect to 100 parts by weight of said fluoropolymer particles.

* * * * *

UNITED STATES PATENT AND TRADEMARK OFFICE
CERTIFICATE OF CORRECTION

PATENT NO.       : 7,659,335 B2
APPLICATION NO.  : 11/247044
DATED            : February 9, 2010
INVENTOR(S)      : Kazuo Konabe It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1109 days.

Signed and Sealed this

Thirtieth Day of November, 2010

David J. Kappos
*Director of the United States Patent and Trademark Office*